Figure 1:
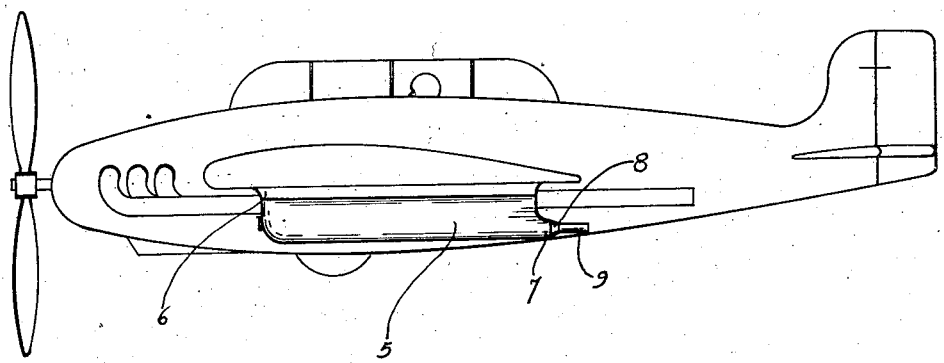

Oct. 8, 1946.　　　R. GODDARD ET AL　　　2,408,774
SPRAY TANK FOR DISPERSING FLUIDS FROM AIRCRAFT
Filed April 24, 1942　　　4 Sheets-Sheet 1

Inventors
Rupert Goddard
Fleming R. Weaver

By Millard F. Peake
Attorney

Oct. 8, 1946.  R. GODDARD ET AL  2,408,774
SPRAY TANK FOR DISPERSING FLUIDS FROM AIRCRAFT
Filed April 24, 1942  4 Sheets-Sheet 2
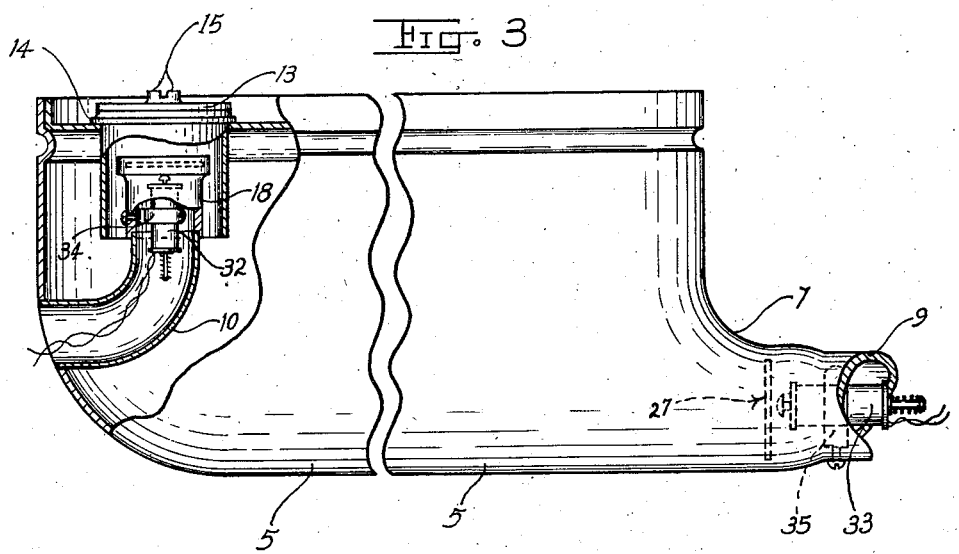
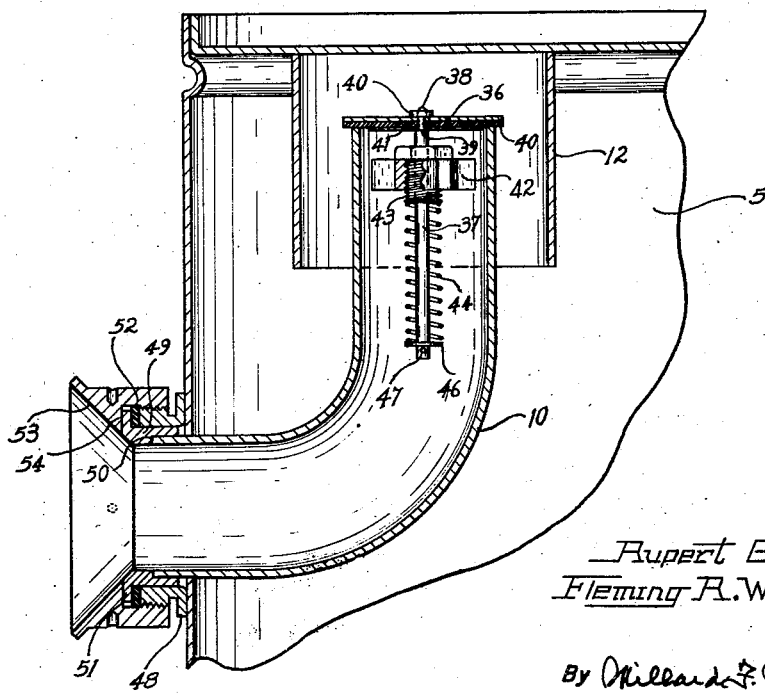
Inventors
Rupert Goddard
Fleming R. Weaver
By Millard F. Peake
Attorney Oct. 8, 1946.   R. GODDARD ET AL   2,408,774
SPRAY TANK FOR DISPERSING FLUIDS FROM AIRCRAFT
Filed April 24, 1942   4 Sheets-Sheet 3

Inventors
Rupert Goddard
Fleming R. Weaver

By Millard F. Peake
Attorney

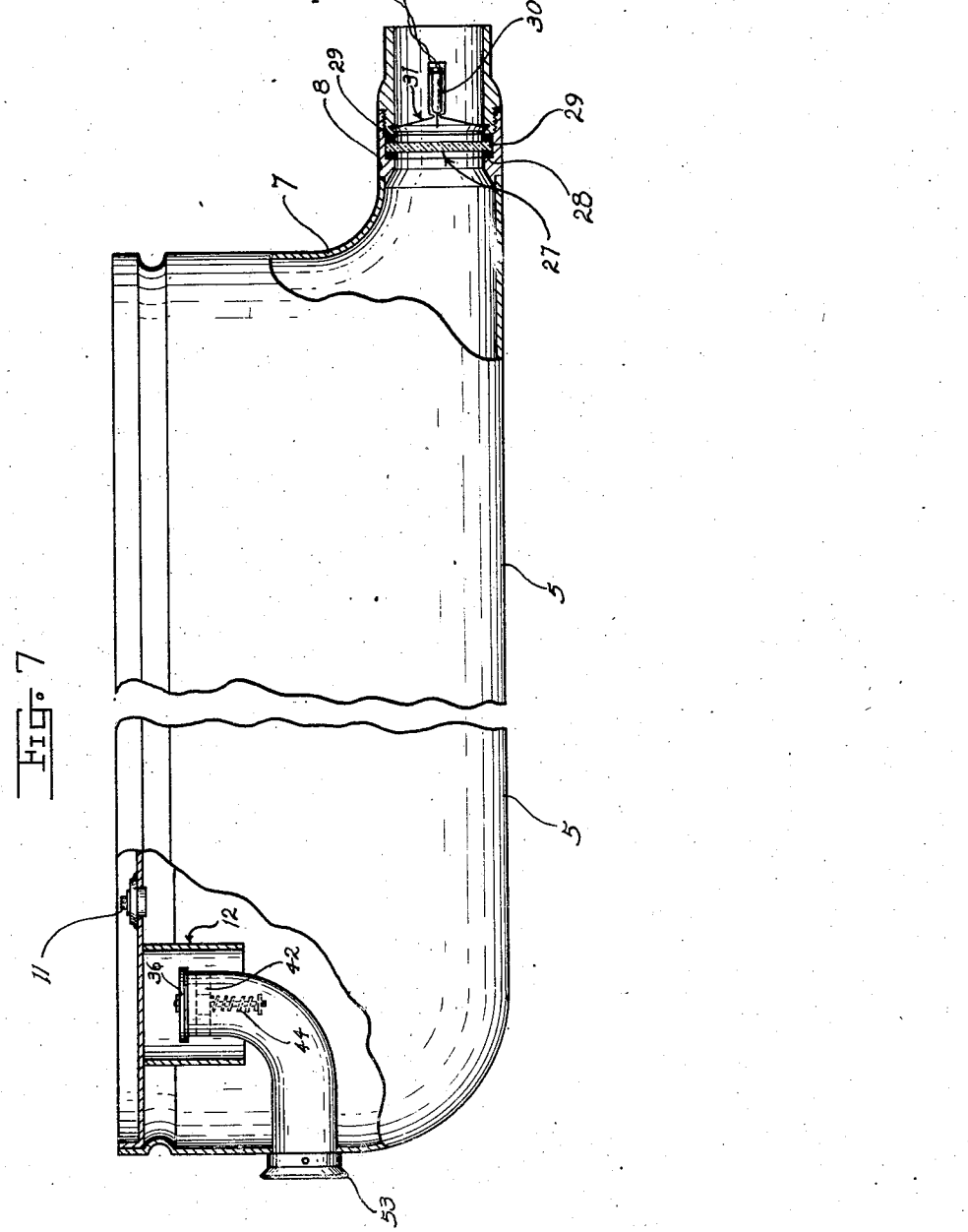

Patented Oct. 8, 1946

2,408,774

UNITED STATES PATENT OFFICE 2,408,774

SPRAY TANK FOR DISPERSING FLUIDS FROM AIRCRAFT

Rupert Goddard, Havre de Grace, and Fleming R. Weaver, Edgewood Arsenal, Md.

Application April 24, 1942, Serial No. 440,388

4 Claims. (Cl. 244—134)

(Granted under the act of March 3, 1883, as amended April 30, 1928; 370 O. G. 757)

The invention described herein may be manufactured and used by or for the Government for governmental purposes, without the payment to use of any royalty thereon.

This invention relates in general to the dispersion of fluids. More particularly the invention is concerned with a method and apparatus for dispersing fluids from moving aircraft.

At the present time, smoke-producing liquids or chemical agents are ejected under pressure from an airplane or other moving aircraft so that the liquid or chemical agent leaves the plane at approximately the same velocity as the plane passes through the air, but in a substantially opposite direction, the liquid falling in the form of relatively stable drops and reacting with the constituents of the air to form a smoke screen. A toxic or vesicant fluid, such as that popularly termed "mustard gas" is generally used, and hence the method and apparatus now being used for dispersing irritant and vesicant materials, of which "mustard gas" is typical, are in general of such a character that the ejected substance will not affect the pilot or personnel, or contact with the plane.

The most efficient methods and apparati that have been, and are now being used for dispersing materials from moving aircraft, embody among other things, a tank or storage reservoir for the fluid to be dispersed, and which can be readily installed on modern aircraft. Preferably, the storage tank is so mounted that it may be instantly released from the plane in the event of a forced landing or other contingency rendering the presence on the plane of highly reactive substances hazardous to the personnel and to those in the vicinity of a crash.

The storage tank is equipped with a discharge line that is so disposed, preferably as to direct the ejected fluid rearwardly with respect to the airplane to prevent injury to the personnel, contact of the fluid with the plane, and for other desirable results known to those skilled in this art.

Previous to now, the liquid to be dispersed has been freed to flow out through the discharge line by gravity feed, or, alternatively, a pressure-producing medium is resorted to; the latter being either in the form of compressed carbon dioxide or some mechanical apparatus, for example, a pump or air compressor incorporated in the system for forcing the reservoir filling therefrom and through the discharge or outlet line. For best performance, whether gravity or pressure feed is resorted to, the system or apparatus usually, additionally, embodies some form of vent mechanism. Especially in systems where the gravity feed method of ejection is employed must a vent be provided if the desirable rapid and uniform discharge of the liquid filling is to be obtained.

Such storage type spray apparatus have in common certain objectionable features, most notably of which are the generally complicated mechanically operated valve discharge and vent mechanisms. Consequently, much time, thought, and effort have been expended in developing for spray apparatus of the type with which we are herein concerned, discharge and vent mechanisms which, respectively, will be materially less complicated and more dependable in operation than are such as are now used.

In the course of our pursuit toward this most desirable end, many and varying kinds of means for facilitating the venting and release of fluid from the storage reservoir were, with varying degrees of success, tried and ultimately for one reason or another abandoned or held in abeyance. In the program of development leading ultimately to our invention as forms the subject matter of this application, due consideration was given to the following named types of closures and in substantially the order indicated.

Especially with reference to the problem involving the improvement of the discharge mechanism, recourse was had to what may be termed a "tear-strip" closure. Without detailing the nature of this form of closure, the same may be dismissed with the observation that it was found to be impracticable because of the difficulty of the proper application of force to peel off the soldered covering of the discharge line. If this covering was soldered just sufficiently to facilitate its easy removal, it appeared too frail for safety.

Another experiment was with a flexible cap for the discharge line. This cap was to be removed by the use of an electrically ignited pyrotechnic mixture but also was found to be impracticable. It appeared from tests made that before sufficient heat could be applied to completely melt the fusible alloy holding the cap in place, liquid escaped from the discharge line and caused solidification of the fused alloy, thereby preventing the freeing of the cap.

Next resort was had to a frangible plate closure. This form of closure was held in abeyance because of the apprehension at the time of the danger of premature breakage where the closure was of glass and "mustard gas" was used as the liquid to be dispersed, and the possibility of destruction of the closure by reaction with smoke-producing agents in the case where the closure was fabricated from synthetic resinous materials.

Finally, as a result of this trial and error method of approach to the problem at hand, recourse was had to what might be aptly termed a "mechanically released rigid plate closure." Experimentation with this type of closure lead to the discovery of means whereby a frangible or readily rupturable disc in association with simple and efficient mechanism for rupturing the same could, advantageously, be incorporated in and made part of the chemical spray system or apparatus to be used therewith for venting and discharge control purposes.

An object of this invention is, therefore, to improve generally upon known methods and apparati for discharging fluids from aircraft.

Another object of the invention is to materially simplify vent and discharge mechanisms as are now known and used in such methods and apparati.

More specifically, an object of the invention is to render practical the use of a frangible element in the discharge and/or vent line of a chemical spray tank.

Another specific object of the invention is the provision of an effective, and practical assembly embodying a frangible sealing element and rupturing mechanism therefor which can with equal efficiency be used in either or both the vent and the discharge line.

Still another object of the invention is to provide a vent through the medium of which the air entering the reservoir may be utilized to insure the desired rate of discharge of the reservoir filling, that is, the fluid to be dispersed.

Yet another object of the invention is the adaption thereof to moving and stationary operations with equally advantageous results; and also its adaptability to any shape or size of reservoir tank, and particularly to a tank having a streamlined body or otherwise shaped or equipped as may be warranted or required to insure correct rates of fluid discharge and air admission.

The invention together with the above enumerated and other objects as will presently appear, will be best understood and appreciated from a perusal of the following specification made in connection with the accompanying drawings, wherein:

Figure 1 is a fragmentary outline of an airplane showing our improved spray tank mounted thereon.

Figure 2 is an elevational view of the tank, with certain parts broken away and other parts shown in section, and illustrating one form of assembly of vent and discharge mechanisms in accordance with the invention.

Figure 3 is a view similar to Figure 2 and showing an alternate assembly of vent and discharge mechanisms in accordance with the invention.

Figure 4 is an enlarged, fragmentary vertical section through the vent-equipped end of the tank, and illustrating a spring loaded vent valve assembly in accordance with this invention.

Figure 5 is a view similar to Figure 4, and illustrating a frangible vent valve assembly forming part of this invention.

Figure 6 is a fragmentary top plan of the tank at the vent-equipped end thereof.

Figure 7 is a view similar to Figure 2 and illustrating still another form of vent and discharge assembly.

Generally, the invention is concerned with apparatus and methods employed for dispersing chemical agents from moving aircraft. The invention contemplates the employment of such procedure in a manner such that the toxic or vesicant fluid, as for example, the typical fluid "mustard gas" may safely be employed without risk to the safety of the apparatus employed, or to the pilot or personnel of the plane.

Primarily, the invention contemplates the provision of improved means for venting the reservoir tank of the apparatus, as well as improved means for controlling the discharge of the chemical agent or fluid from the tank. The invention further contemplates the provision of a mechanism that can be used with equal faciilty and advantages either as the vent control or as the discharge control, optionally, and, consequently can be used in pairs, and of which pair one such mechanism may be used as the vent control and other such mechanism of the pair used as the discharge control.

Referring now more particularly to Figure 2 of the drawings, there is illustrated in this figure a form of apparatus for carrying the invention in a simple phase into effect.

In the figure, as well as in other figures of the drawings, 5 indicates a tank adapted to act as a reservoir for the particular fluid that is to be dispersed. In constructing the tank, steel or such alloys as Duraluminum may be used if the employed chemicals are non-corrosive, while if the chemicals employed are of a corrosive nature, the tank is preferably constructed of commercial material, as for example, the commercial metal known as Monel. Also, while the shape of the tank may vary as desire or expediency may dictate, it is preferably streamlined and so proportioned as to reduce to the minimum the air resistance encountered in flight.

In practice, the tank 5 may be located on the plane wherever deemed most advantageous, but by way of illustration and not by limitation, the tank is shown as mounted on and as nearly tangential to the wing as practicable. Any suitable and convenient bracket structure (not shown) may be resorted to for suspending the tank, and a streamlined fairing 6, as shown, is provided to shield the supporting brackets and other external interfering members with the view to further reducing the wind resistance.

Prior art forms of reservoir tanks generally employ what is commonly known and referred to as an "elbow type of discharge line," and as such type of discharge line is well known, detailed description thereof is unnecessary. The tank of this invention eliminates this type of elbow discharge line since it has formed integral with the walls thereof a tubular discharge neck 7. Discharge neck 7 extends rearwardly from the bottom portion of tank 5 and has connected therewith through the medium of a nipple 8 a tubular discharge spout or nozzle 9. By reason of this characteristic feature of the tank, there results, in effect, an in-line flow of the liquid from the tank during the period of discharge.

In accordance with this invention the reservoir tank is advantageously equipped with an internal vent tube 10. The tube 10 is in the form of an elbow, and extends inwardly and upwardly from the front wall of the tank in registry with a vent opening provided, as shown, in the tank wall.

For conveniently filling the tank 5 the same is equipped, preferably in the top wall thereof, with a filling opening for which a closure plug 11 is provided. Access to this opening may easily be had upon removal of the fairing 6.

To enhance the efficiency of the apparatus and as a pronounced safety feature, there is provided an anti-splash shield 12. The shield 12 is tubular in form and telescopes the upper or inner end of the vent or air inlet 10, being spaced circumferentially from the tube 10 for obvious reasons. Recourse to such a shield will prevent the liquid in the tank rising to a level in the region of the vent tube as would result in the covering of this end of the tube 10 with the liquid contents of the tank, and possibly the spilling over and escape of the filling through the vent tube. Thus the use of such as shield 12 must be regarded highly as a safety factor.

Figure 5:
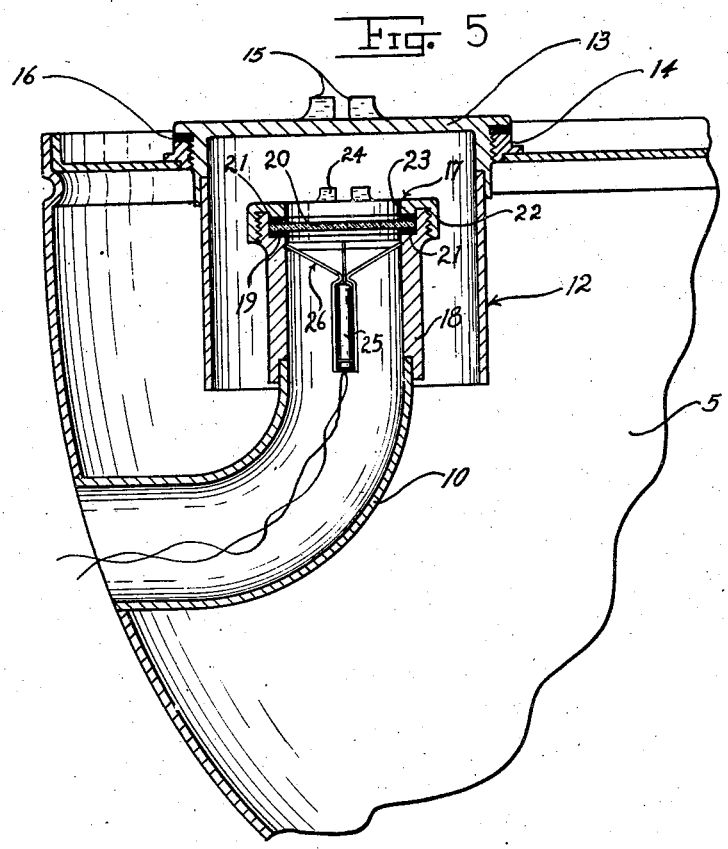
Figure 6:
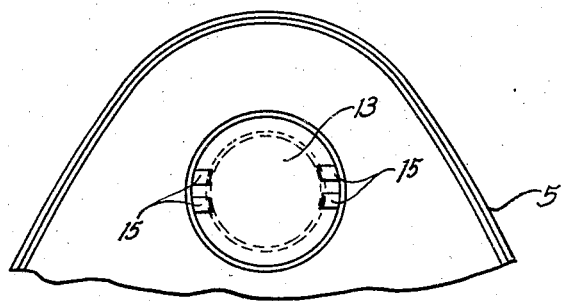

The manner of mounting or suspending the shield 12 may be varied, of course, as circumstances warrant or dictate, its simplicity of structure and the location of the vent or air intake 10 providing flexibility with respect to mode of installation. Thus incidental to the assembling of the tank the shield 12 at one end may be readily welded or otherwise made substantially integral with the inner side of the top wall of the tank as shown in Figure 4. Alternately, and as best shown in Figure 5, the shield 12 is intimately associated with a screw-cap or plug 13 removably seating within an internally threaded boss 14 provided on the top wall of the tank.

The boss 14 is welded to or otherwise permanently united with the tank wall to rim an opening provided therein, and through which the shield 12 is passed into the tank to assume proper position with respect to the vent tube as the cap-plug 13 is threaded home.

To facilitate placement and removal thereof, cap-plug 13 is provided with diametrically opposed pairs of closely spaced lugs 15 to be engaged by a suitable tool in a manner apparent to effect a turning movement of the cap-plug in the desired or necessary direction.

A suitable gasket 16 is interposed between the boss 14 and the projecting peripheral edge of the cap-plug 13 overlying the boss as shown.

Access to cap-plug 13 is had in the same manner as above set out with reference to gaining access to the aforementioned plug 11.

When this tank is employed in accordance with the invention, air from the surrounding atmosphere passes through the tube 10 into the tank under positive pressure for displacing the fluid discharging under pressure through the outlet nozzle 9. Thus with this tank mechanical appliances, compressed carbon dioxide, and similar pressure-producing apparatus are advantageously eliminated. Also notwithstanding the desired elimination of such pressure-producing media as just referred to, air under positive pressure is, as above explained, admitted into the tank throughout the period of discharge, and hence recourse to gravity feed of the fluid to the discharge line is not necessary.

Adverting again to Figure 2, there are illustrated therein simple forms of vent and discharge control mechanisms. In their broad aspects, these forms of control mechanisms are substantially identical; each essentially embodying a frangible sealing element and means for applying force to the sealing element to completely dissipate the latter for assuring free flow or passage through the respective control mechanism.

Different types of frangible or rupturable sealing elements may be employed. For example, the sealing element may be in the form of a plate of glass, or alternately, in the form of a plate or disc molded from some phenolic condensation product, such as "Bakelite" or similar plastic readily moldable to shape. Glass is least preferred due to its tendency to crack or break as a result of shock or from pressure resulting from the tightening up of the retaining member or members employed for securing it in place.

It may also be found advantageous, especially so in the case of glass, to construct the sealing element of laminated sheets rather than a single thick sheet, due to the fact that then a sheet of known breaking strength might be used, and as many thicknesses of such sheet used together as would be required to give the element a selected predetermined breaking strength.

In addition to the above observations regarding the material from which the sealing element is to be fabricated, it may also be observed that such material should be acid-proof or non-corrodible so as to withstand the effects of such substances as titanium tetrachloride commonly used as smoke agents.

Figure 2:
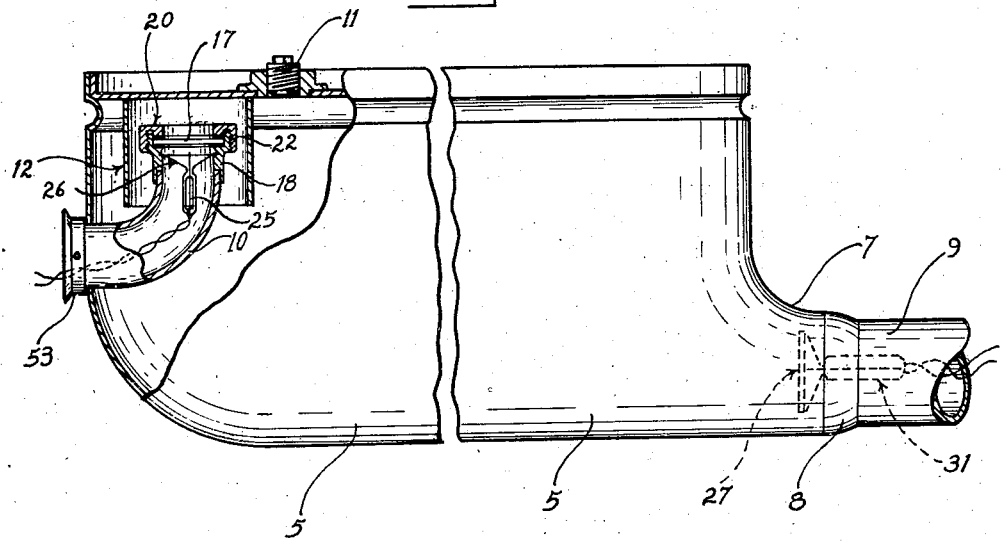

The form of vent control mechanism shown in Figure 2 is detailed to advantage in Figure 5, and to this latter figure reference is now made for a better understanding of the assembly involved in this particular form of vent mechanism.

As shown in Figure 5, there is mounted on the inner end of the vent tube 10 a cap assembly indicated generally by the reference numeral 17. This cap assembly includes a tubular body number 18 that at its lower end is formed with an internal groove into which is snugly fitted the upper extremity of the vent tube 10. At its lower end, the cap body 18 is welded or otherwise made fast to the vent tube as shown, thus completing an air tight joint between these members.

At its upper end cap body 18 is diametrically enlarged, and this enlargement is characterized by being formed with an annular internal groove 19 and external screw threads as shown. The groove 19 constitutes a seat for a sealing element 20 embodying those characteristics herein before detailed as most desirable for the purpose of this invention, and gaskets 21, 21 of non-corrodible and acid-proof material between which the marginal edge of the sealing element is accommodated.

A securing ring or annulus 22 threads home on the enlargement of the cap body 18, and embodies an inwardly directed flange 23 that has pressure-exerting contact with the upper gasket 21 to tightly clamp the sealing element or closure 20 and associated gaskets within the confines of groove or seat 19 to thereby prevent leakage.

To facilitate placement and removal of the securing annulus 22 the same, similarly to plug 13, is equipped with pairs of tool-co-acting lugs 24.

For rupturing, or as actually contemplated, completely "blowing out" the frangible sealing or closure element 20, resort may be had to any suitable mechanically, electrically or otherwise readily operated, and preferably remote controlled device found suitable for the intended purpose.

By way of illustration, and not by way of restriction, a preferred commercial type of detonator, 25 is shown mounted within the tube 10 and in sufficient proximity to the closure 20 that the latter will receive the full force of the explosion and consequently be so shattered and ruptured or completely fragmented as to offer no resistance to the on-rush of air passing through the tube 10 and into the tank 5.

Any suitably supporting or clamping means 26 is employed to hold fast the detonator 25 or its equivalent in place. A control wire or the like extends from the detonator to adjacent the operator so that he may operate the detonator readily.

As before noted, and as illustrated in Figure 2 of the drawings, substantially the same identical means is employed as the discharge control mechanism. In Figure 2 such means is phantomly illustrated, whereas in Figure 7 this particular discharge control mechanism is detailed. Thus in Figure 7, 27 indicates the frangible or rupturable sealing element of the discharge control mechanism illustrated. The sealing or closure element 27 is securely held in place by having its marginal edge clamped between an annular fixed shoulder 28 formed internally of the coupling nipple 8 and that end of the discharge nozzle that is threaded into the nipple as shown.

The sealing or closure element 27 is identical in practically every respect with the sealing or closure element 20, and like the latter has its marginal edge disposed between non-corrodible and acid-proof gaskets 29, 29 to assure a fluid and air tight joint at the location of the sealing element.

Like the element 20, sealing element 27 is subject to the shattering force and effect of a detonator 30. Detonator 30 is identical with detonator 25, and means 31, similar to the securing and fastening means 26, utilized for securing detonator 30 in place. Preferably, detonator 30 is advantageously positioned within nozzle 9, and has a control wire or the like extending therefrom to adjacent the operator so that he may conveniently operate the detonators in desired sequence or simultaneously as might be found most desirable.

In order to illustrate the manner in which the principles of the invention may be further applied, a slightly modified form of closure-shattering, closure "blow-out," or force-applying device is shown in Figure 3.

In this Figure 3 the force-applying or blow-out device for the shatterable closure 20 of the vent control mechanism is indicated generally by the numeral 32 while 33 indicates generally the force-applying or blow-out device for the shatterable closure 27 of the discharge control mechanism.

Each of the devices 32, 33 is in the form of a solenoid that, in the case of the device 32 is secured in operative position relative to closure 20 and within the vent tube 10 by a suitable clip 34, and in the case of the device 33 is secured in operative position relative to closure 27 and within the nozzle 9 or where otherwise found most desirable by a similar clip 35.

Devices 32, 33 are equipped with control means extending therefrom to adjacent the operator in order that he might, as in the case of detonators 25, 30, conveniently operate them in sequence or simultaneously as desired or expediency may dictate, and to the end that venting of the tank and release of the fluid to be dispersed may be accomplished with the most advantageous and effective results.

From the foregoing it will be apparent that insofar as the factors pertaining to vent and discharge control, all the desirable features noted in connection with Figure 2 are retained, while at the same time the need for replacing the shock-producing instrumentalities employed for shattering the frangible closures following the exhausting of the tank contents is eliminated. Obviously in the case of solenoids, they may be used repeatedly over a considerable period of time, and no replacement thereof is ordinarily required incidental to each operation of recharging the tank with the chemical agent, and as is required where detonators or similar self-destructive media are employed.

In order to control venting of the tank, or the admission of air into the tank in response to the air speed of the plane, and at the same time assure admission of air under a positive pressure throughout the period of discharge, a type of spring loaded vent control valve shown in Figure 4 may be used with beneficial results.

The valve of Figure 4 as a whole is shown mounted at the inner end of vent tube 10 and comprises a disc 36 and a stem 37, the stem being axially movable within the said end of the vent tube and the disc normally seating on the extremity of the tube.

Valve stem 37 at one end is diametrically reduced to provide a thread pin 38 and a shoulder 39. Disc 36 is removably secured on the stem, being clamped on the pin 38 between shoulder 39 and a nut 40 threaded on the pin as illustrated.

To improve the seating action of disc 36 and to compensate for wear there is disposed at the seating side of the disc a somewhat resilient gasket 40 of substantially the same diameter as the valve disc. Gasket 40 is held flat against the disc by a washer plate 41 of slightly less diameter than the gasket and the disc and is accommodated with the inner end of the vent tube. Washer plate 41 is interposed between the gasket 40 and shoulder 39 as shown.

Manifestly any suitable means may be employed for mounting the valve provided such means makes provision for constraining the seating and unseating action of the valve to an axial movement relative to the inner end of the vent tube. In the embodiment illustrated, such means comprises a spider 42 secured in a manner found to be most practical for the purpose within the inner end of vent tube 10 and a removable guide sleeve 43 threaded through the hub of the spider and through which the valve stem 37 has a sliding fit.

The guide sleeve 43 preferably has at one end thereof an enlarged head as shown to seat against the spider hub and limit movement of the sleeve through the hub incidental to assembly thus facilitating proper adjustment of the sleeve.

The spring of this valve is indicated at 44, and is sleeved on the valve stem 37. One end of the spring impinges against a collar 46 on the inner end of the valve stem, pin 47 acting as a stop or abutment for the collar. The opposite end of the spring is suitably seated against the sleeve 43. As is obvious, spring 44 acts in opposition to air pressure developing in the vent tube for normally holding the valve in closed or seated condition.

It is apparent that this spring-loaded valve is utilized as the vent control for the tank in conjunction with either the discharge control mechanism of Figure 2 or the discharge control mechanism of Figure 3, optionally. In either event, the operation is substantially as follows:

The spring 44 of the vent valve is normally of sufficient tension to keep the disc 36 seated against the inner end of the vent tube against the action of air pressure just below that of the air speed of the plane at which operation, that is, discharge and dispersion of the chemical agent contents of tank 5, is desired. It may be assumed that this operating or critical air speed of the plane is 300 M. P. H. Thus at any air speed below this critical air speed the vent valve is closed, while at this critical speed or at a speed in excess of critical speed the vent valve is open, admitting an ingress of air into the tank.

In operating the apparatus initial pressure is built up in tank 5 by increasing the air speed of the plane above the herein assumed critical speed to an extent sufficient to cause such a pressure through the vent tube that impinging against the valve disc 36 will result in a slight compression of spring 44 and an opening of the valve to admit a stream of air into the tank. When as a result of this action an equalization of external and internal pressures is attained, the air speed is reduced until critical or operating speed is reached. When critical speed is reached, the operator then actuates the discharge control device of Figure 2 or Figure 3 as the case may be for shattering or blowing out the seal or closure element 27, permitting the escape of the fluid from tank 5 through the discharge nozzle 9.

This discharge of fluid will naturally result in a reduction of internal pressure, but the external air pressure on valve disc 36 at the critical air speed of the plane will, as is apparent from the foregoing, maintain valve disc 36 for the period of discharge open. Consequently, air under positive pressure is admitted through the vent valve throughout this period of fluid discharge, or until such time as the air speed is reduced below critical or operation speed, and at which time the valve will then close.

By "critical" or "operation speed" of the aircraft, and as such terms have been herein employed, is meant the velocity of the moving plane in the air which is the factor determining the opportune moment of release of the smoke-producing agent. In this connection, it might be observed that complete atomization of the liquid to be dispersed can be obtained if counter-longitudinal motion between the liquid and the air is permitted to prevail at the time of release of the liquid, whereas the liquid falls as if poured from an elevation at rest and travels to the ground in substantially stable drops if this counter-longitudinal motion of the air at the time of discharge is prevented. Such counter-longitudinal movement of the air is prevented by projecting the liquid from the moving aircraft with a velocity substantially equal and opposite to the velocity in the air of the moving aircraft. Complete atomization at the instant of discharge makes possible the discharge of highly persistent materials in comparatively non-persistent form on the ground, whereas if the liquid is permitted to fall to the ground in the form of stable drops, the resulting smoke curtain may be made to rest advantageously on the ground.

Obviously the spring loaded vent valve just considered may be used in lieu of the vent controls of Figures 2 and 3 without sacrificing any advantage, while at the same time obviating the need of replacing the vent seal or closure following each liquid dispersing action.

A funnel for effectively directing the air stream into the vent tube 10 may be made readily available. As best shown in Figure 4, where a funnel is used there is welded to the wall of tank 5 a mounting ring 48 and the inlet end of the tube terminates within the confines of the ring. A gland ring 49 is fitted into the mounting ring 48, and at its inner end is preferably formed with an internal groove 50 in which the inlet extremity of the vent tube seats. At its outer end the gland ring has formed integrally therewith a flange 51 between which and the ring 48 gasket 52 is disposed.

The funnel, indicated by numeral 53, is threaded onto the mounting ring 48, and when threaded home an internal shoulder 54 formed inwardly of the flared end of the funnel jams against the flange 51 of the gland ring 49 to urge the latter inward of the mounting ring and into tight fitting engagement with the inlet end of the vent tube.

It is obviously clear that the considered funnel assembly can be used regardless of the specific form of vent control employed.

It will also be understood from the foregoing that the various forms of vent and discharge controls may be interchangeably used, and that many variations in selection and use of the several forms of controls illustrated and described herein may be made. Likewise it is to be understood that the invention comprehends many variations in the mode of operation. Consequently, the invention is not limited to that which has been detailed herein by way of example, but is to be considered as embracing all forms of apparatus and variants of method falling within the scope of the appended claims.

For example, to those skilled in the art it will be appreciated that the invention may be readily adapted to the elbow-type of discharge line referred to in the reference herein to prior art forms of tanks. Then, too, any one of the vent controls contemplated by the invention may be utilized on connection with, for example, a suitable intermittent valve in the discharge line so that intermittent discharge of the fluid may be had when found desirable, and as would be desired in the employment of the invention as a signaling system.

It will also be observed that while the invention is particularly well adapted to military purposes, it may be used to advantage for agricultural protection.

Having so described the invention, what we claim is:

1. A liquid spray device for airplanes comprising a jettisonable storage tank for the liquid to be dispersed and adapted to be mounted on the airplane, an internally positioned vent tube opening at one end thereof to the atmosphere through the wall of the tank whereby positive pressure is produced for discharging the contents of the tank and at an opposite end opening into the tank, a discharge line extending from the tank, destructible closure elements for the vent tube and discharge line respectively, and detonating instrumentalities disposed in proximity to each of the respective closures for removing them, each of said instrumentalities having electrical control wires extending therefrom for operation by remote control.

2. A liquid spray device for airplanes comprising a jettisonable storage tank for the liquid to be dispersed and adapted to be mounted on the airplane, an internally positioned vent tube opening at one end thereof to the atmosphere through the wall of the tank whereby a positive pressure is produced for discharging and atomizing the contents of the tank and at an opposite end opening into tank, a discharge line extending from the tank, a rupturable sealing element mounted at the inner end of the vent tube, a rupturable sealing element mounted inward of the discharge line, detonators for rupturing each of the respective sealing elements respectively disposed within the vent tube and discharge line, and electric control wires extending from the detonators.

3. A liquid spray device for airplanes comprising a storage tank for the liquid to be dispersed and adapted to be mounted on the airplane, a vent tube opening at one end thereof to the atmosphere through the wall of the tank and at an opposite end into the tank, a rupturable sealing element mounted at the inner end of the vent tube, a discharge line extending from the tank, a rupturable sealing element mounted inward of the discharge line, and solenoids for rupturing the respective sealing elements disposed within the vent tube and discharge line.

4. A storage tank for liquid spray purposes having vent control means including a vent tube opening to the atmosphere at one end and at an opposite end opening to the interior of the tank and extending upwardly therein, and a vertical tubular shield telescoping the second named end of the tube and circumferentially spaced from the tube, said tubular shield extending downwardly from a top wall of the tank to prevent liquid in the tank from splashing into the vent tube.

RUPERT GODDARD.
FLEMING R. WEAVER.